US012764194B2

(12) United States Patent
Teng

(10) Patent No.: US 12,764,194 B2
(45) Date of Patent: Oct. 13, 2026

(54) METHOD FOR ESTABLISHING VIRTUAL PRIVATE NETWORK CONNECTION AND NETWORK DEVICE

(71) Applicant: ASUSTeK COMPUTER INC., Taipei City (TW)

(72) Inventor: Wei-Sheng Teng, Taipei City (TW)

(73) Assignee: ASUSTeK COMPUTER INC., Taipei City (TW)

( * ) Notice: Subject to any disclaimer, the term of this patent is extended or adjusted under 35 U.S.C. 154(b) by 294 days.

(21) Appl. No.: 18/485,319

(22) Filed: Oct. 12, 2023

(65) Prior Publication Data

US 2024/0388635 A1 Nov. 21, 2024

(30) Foreign Application Priority Data

May 19, 2023 (TW) ................................ 112118635

(51) Int. Cl.
*H04L 67/141* (2022.01)
*H04L 12/46* (2006.01)

(52) U.S. Cl.
CPC ........ *H04L 67/141* (2013.01); *H04L 12/4641* (2013.01)

(58) Field of Classification Search
CPC .......................... H04L 67/141; H04L 12/4641
See application file for complete search history.

(56) References Cited

U.S. PATENT DOCUMENTS 11,962,503 B1 * 4/2024 Fish ...................... H04L 45/745
2015/0188949 A1 * 7/2015 Mahaffey ............. H04W 12/37 726/1
2018/0035291 A1 * 2/2018 Dowlatkhah ......... H04W 12/50
2020/0279051 A1 9/2020 Goldfarb et al.
2021/0021537 A1 * 1/2021 Yuan ....................... H04L 45/64
2022/0141190 A1 * 5/2022 Olson ..................... H04L 45/22 726/15
2022/0200895 A1 * 6/2022 Soma .................... H04L 45/245
2022/0255865 A1 * 8/2022 Narula .................... H04L 47/24
2022/0256453 A1 * 8/2022 Cheong ................. H04W 48/20
2022/0337547 A1 * 10/2022 Dinha ................. H04L 61/4511
2022/0353152 A1 11/2022 Ramaswamy
2022/0361261 A1 * 11/2022 Jaulin ................... H04W 76/12
2022/0417831 A1 * 12/2022 Alarcon ............. H04W 40/248
(Continued)

FOREIGN PATENT DOCUMENTS

CN 105429800 3/2016
CN 106453024 2/2017

*Primary Examiner* — Blake J Rubin
(74) *Attorney, Agent, or Firm* — JCIPRNET

(57) ABSTRACT

A method for establishing a virtual private network (VPN) connection and a network device are disclosed. The method includes the following steps. The network device establishes a connection with a main routing device to construct a mesh network. The network device is a sub-routing device of the mesh network. The network device receives a VPN configuration from the main routing device. The main routing device is a VPN server corresponding to the VPN configuration. The network device determines whether to be connected to Internet through the main routing device. In response to not being connected to the Internet through the main routing device, the network device determines to establish a VPN connection with the main routing device according to the VPN configuration.

10 Claims, 5 Drawing Sheets

(56) References Cited

U.S. PATENT DOCUMENTS

| | | | | |
|---|---|---|---|---|
| 2023/0254284 | A1* | 8/2023 | McCord | H04L 63/0272<br>726/15 |
| 2023/0308453 | A1* | 9/2023 | Lefèvre | H04L 41/50 |

* cited by examiner

METHOD FOR ESTABLISHING VIRTUAL PRIVATE NETWORK CONNECTION AND NETWORK DEVICE

CROSS-REFERENCE TO RELATED APPLICATION

This application claims the priority benefit of Taiwan application serial no. 112118635, filed on May 19, 2023. The entirety of the above-mentioned patent application is hereby incorporated by reference herein and made a part of this specification.

BACKGROUND

Technical Field

This disclosure relates to a method and a network device for establishing a virtual private network connection.

Description of Related Art

A virtual private network (VPN) mainly uses security technologies such as tunneling technology as well as encryption and decryption on the public Internet to establish a private and secure network connection. At present, when a user wants to use VPN to connect to the Internet, the user usually installs VPN software on a terminal device (such as a mobile phone or a computer) to connect to an external VPN server. In addition, the user may install a VPN extension plug-in on a router, so that the terminal device of the user may be connected to the external VPN server through the router. However, the above conventional method requires the user to manually install the VPN software or manually configure a VPN configuration on the router, and setting steps thereof are cumbersome and easily cause troubles for the user.

SUMMARY

The disclosure provides a method for establishing a VPN connection, which includes the following. A network device establishes a connection with a main routing device to construct a mesh network. The network device is a sub-routing device of the mesh network. The network device receives a VPN configuration from the main routing device. The main routing device is a VPN server corresponding to the VPN configuration. The network device determines whether to be connected to Internet through the main routing device. In response to not being connected to the Internet through the main routing device, the network device decides to establish a VPN connection with the main routing device according to the VPN configuration.

The disclosure further provides a network device, which includes a transceiver, a storage device, and a processor. The processor is coupled to the transceiver and the storage device, and is configured to perform the following operations. A connection with a main routing device is established to construct a mesh network. The network device is a sub-routing device of the mesh network. A VPN configuration is received from the main routing device. The main routing device is a VPN server corresponding to the VPN configuration. It is determined whether to be connected to Internet through the main routing device. In response to not being connected to the Internet through the main routing device, it is decided to establish a VPN connection with the main routing device according to the VPN configuration.

Based on the above, in the embodiment of the disclosure, the network device as the sub-routing device may establish the mesh network with the main routing device. The main routing device establishes the VPN server and automatically transmits the VPN configuration to the network device, so that the network device may receive the VPN configuration from the main routing device. Afterwards, when the network device is not connected to the Internet through the main routing device, the network device may automatically establish the VPN connection to the main routing device according to the recorded VPN configuration. In this way, the user does not need to perform the cumbersome VPN configuration on the network device, and may enable the terminal device to obtain a VPN encrypted connection by connecting to the network device, thus greatly improving convenience and efficiency of establishing the VPN connection.

DETAILED DESCRIPTION OF DISCLOSED EMBODIMENTS

Figure 1:
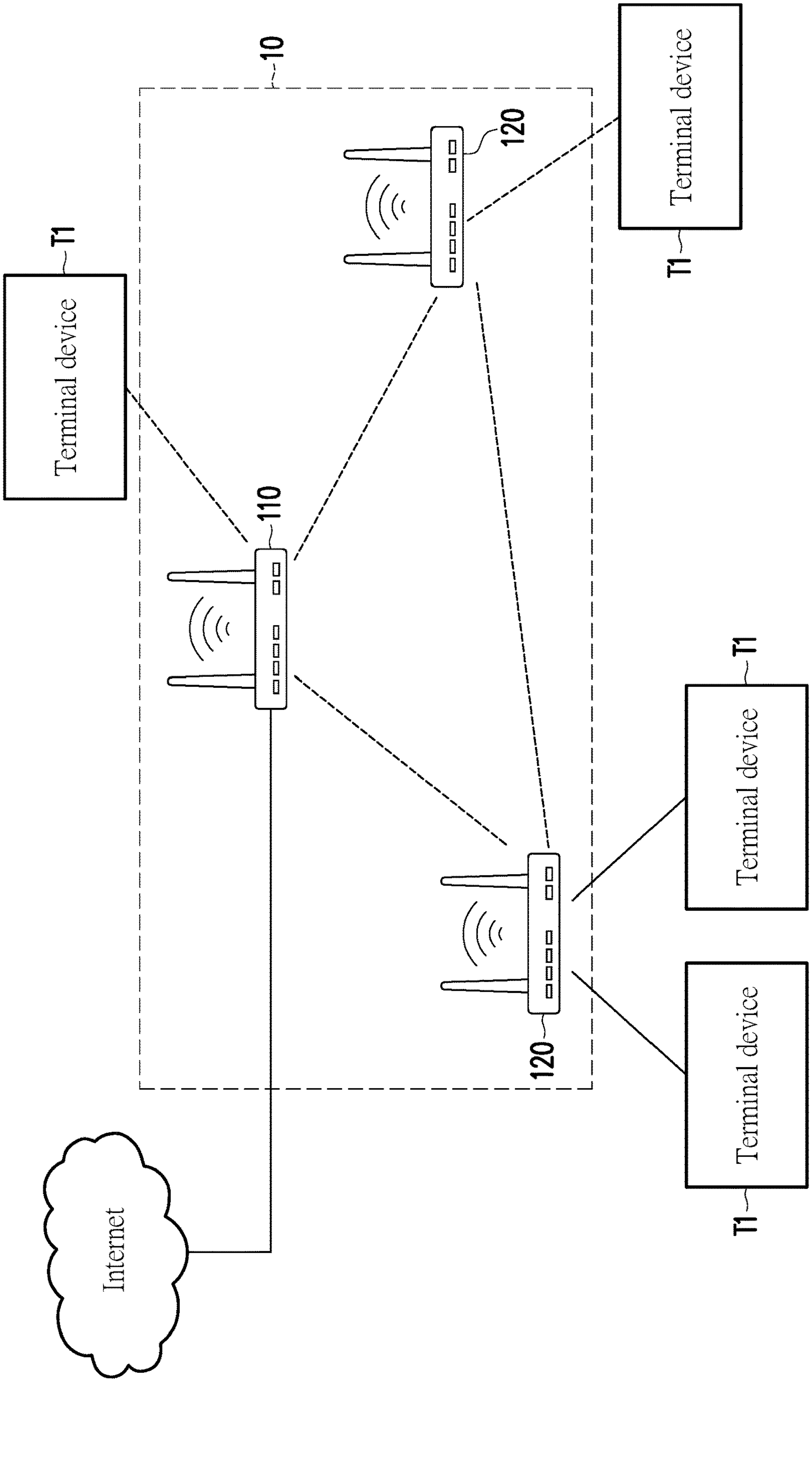
FIG. 1 is a schematic view of a mesh network according to an embodiment of the disclosure.

Reference will now be made in detail to the exemplary embodiments of the disclosure, and examples of the exemplary embodiments are illustrated in the accompanying drawings. Whenever possible, the same reference numerals are used in the drawings and descriptions to indicate the same or similar parts.

Referring to FIG. 1, a mesh network 10 may be formed by multiple network access points connected to one another, and the network access points may include a main routing device and multiple sub-routing devices. In other words, a main routing device 110 may establish the mesh network 10 with a network device 120 serving as the sub-routing device. The mesh network 10 may include multiple sub-routing devices. For convenience of description, only two sub-routing devices are shown in FIG. 1. However, the disclosure does not limit the number of sub-routing devices under the main routing device 110.

The main routing device 110 serves as a gateway connecting the mesh network 10 to public Internet 20. For example, the main routing device 110 may be connected to the Internet 20 through a modem of an Internet service provider (ISP). The network device 120 serving as the sub-routing device may extend coverage of wireless signals. In some embodiments, the main routing device 110 and the network device 120 may use a frequency band of 2.4 GHz or 5 GHz to communicate wirelessly with a terminal device T1. In some embodiments, the terminal device T1 may use a single SSID to be connected to the main routing device 110 or the network device 120. Compared to using only one main routing device to establish a networking environment, the mesh network 10 with multiple network nodes has advantages of increasing a coverage area of a wireless network, improving stability and transmission rate, and the like.

In some embodiments, the main routing device 110 and the network device 120 serving as the sub-routing device may establish the mesh network 10 according to an Easymesh standard formulated by the Wi-Fi Alliance. In some embodiments, when the main routing device 110 and the network device 120 serving as the sub-routing device construct a mesh Wi-Fi, the main routing device 110 is a multiple access point (Multi-AP) controller, and the network device 120 is a Multi-AP agent device. In some embodiments, the main routing device 110 and the network device 120 serving as the sub-routing device may support the IEEE 802.11 k/v/r protocol or IEEE 802.11 s protocol.

In different embodiments, the main routing device 110 may be connected to the network device 120 serving as the sub-routing device through a wired communication interface or a wireless communication interface. The above wired communication interface is, for example, Ethernet, a coaxial cable, or a power line. The above wireless communication interface is, for example, Wi-Fi or Bluetooth.

In some embodiments, the terminal device T1 is, for example, a smart phone, a tablet computer, a game console, a notebook computer, a desktop computer, a smart home appliance, an Internet of Things device, etc., and the disclosure is not limited thereto. The terminal device T1 may be connected to the Internet by being connected to the network access points in the mesh network 10.

Figure 2:
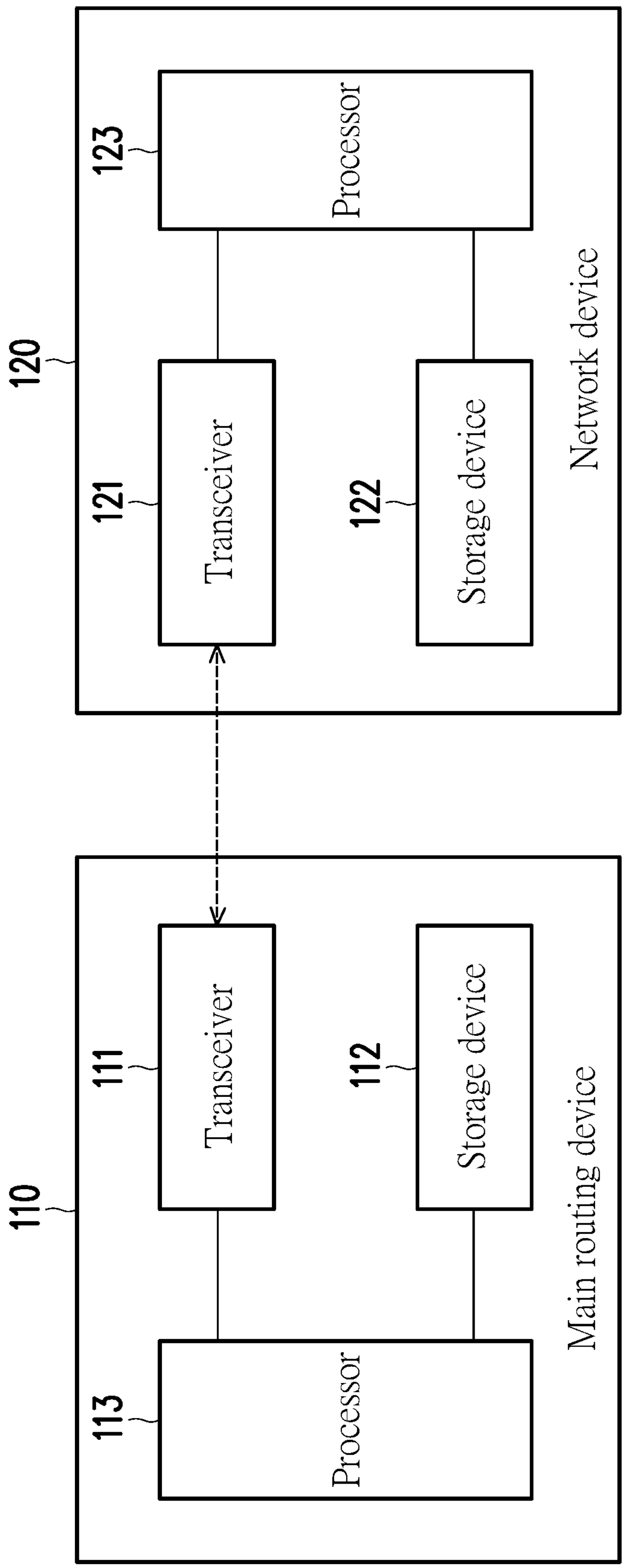
FIG. 2 is a schematic view of a main routing device and a network device according to an embodiment of the disclosure.

Referring to FIG. 2, the main routing device 110 may include a transceiver 111, a storage device 112, and a processor 113. The processor 113 is coupled to the transceiver 111 and the storage device 112. The network device 120 may include a transceiver 121, a storage device 122, and a processor 123. The processor 123 is coupled to the transceiver 121 and the storage device 122.

The transceiver 111 and the transceiver 121 may transmit and receive signals in a wireless or wired manner. The transceiver may further perform operations such as low-noise amplification, impedance matching, frequency mixing, upward or downward frequency conversion, filtering, amplification, and the like. The main routing device 110 may receive and transmit data through the transceiver 111, and the network device 120 may receive and transmit the data through the transceiver 121. In some embodiments, the main routing device 110 and the network device 120 may further include antennas (not shown) respectively.

The storage device 112 and the storage device 122 are configured to store the data such as files, instructions, program codes, software modules, etc., which may be, for example, any type of fixed or removable random access memory (RAM), read-only memory (ROM), flash memory or other similar devices, integrated circuits, or a combination thereof.

The processor 113 and the processor 123 are, for example, programmable general-purpose or special-purpose microprocessors, digital signal processors (DSPs), programmable controllers, application specific integrated circuits (ASICs), programmable logic devices (PLDs), other similar devices, or a combination of the devices.

The processor 113 may execute the program codes, software/firmware modules, instructions, etc. recorded in the storage device 112, and the processor 123 may execute the program codes, software/firmware modules, instructions, etc. recorded in the storage device 122, so as to implement a method for establishing a VPN connection in this embodiment of the disclosure. In other words, the processor 113 and the processor 123 are respectively configured to perform respective corresponding operations hereinafter.

Figure 3:
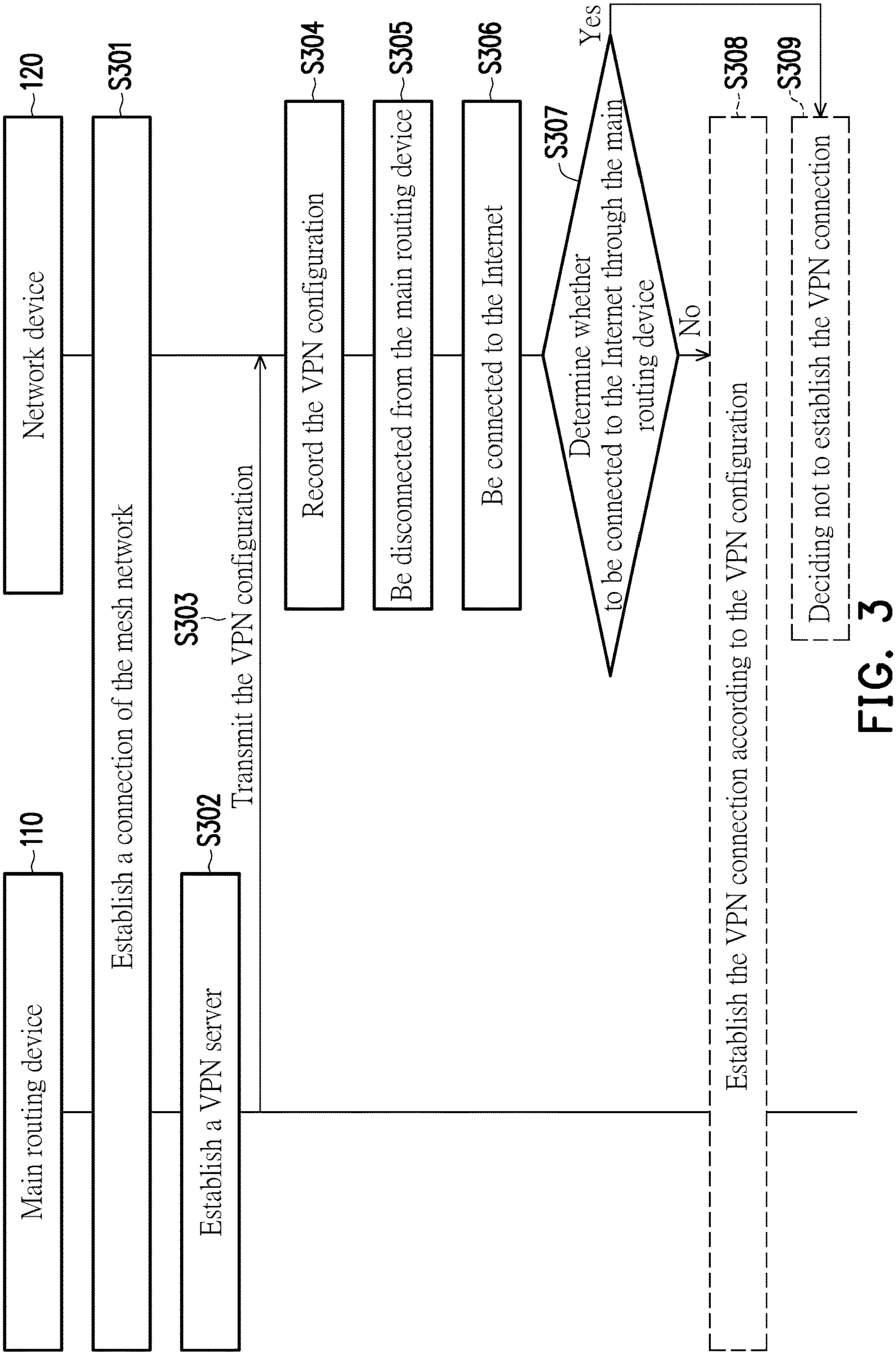
FIG. 3 is a flowchart of a method for establishing a VPN connection according to an embodiment of the disclosure.

Referring to FIG. 3, in step S301, the main routing device 110 and the network device 120 establish a connection of the mesh network 10. In detail, after the main routing device 110 is connected to the Internet, the network device 120 may establish the connection of the mesh network with the main routing device 110. For example, a user may combine the main routing device 110 and the network device 120 into a mesh Wi-Fi system. That is to say, the network device 120 may establish a connection with the main routing device 110 to construct the mesh network 10, and the network device 120 is a sub-routing device of the mesh network 10. In some embodiments, the main routing device 110 and the network device 120 may perform an automatic configuration search/response in the Easymesh standard to establish the connection of the mesh network.

In step S302, the main routing device 110 establishes a VPN server to generate a VPN configuration, and the main routing device 110 is the VPN server corresponding to the VPN configuration. In detail, the user may enter a router management interface of the main routing device 110 through a browser, and select a suitable VPN protocol and configure server settings in the router management interface of the main routing device 110. The VPN configuration may be, for example, a VPN profile, which may include a user name, user password, VPN server address, port, key, or encryption method of the VPN server, etc.

In some embodiments, the main routing device 110 may establish the VPN server according to the VPN protocol. The VPN protocol is, for example, a Wireguard protocol, a point to point tunneling protocol (PPTP), a layer two tunneling protocol (L2TP), an openVPN protocol, or an Internet protocol security (IPsec), etc. The disclosure is not limited thereto.

In step S303, in response to generating the VPN configuration, the main routing device 110 synchronously transmits the VPN configuration to the network device 120 in the mesh network 10. In detail, after the main routing device 110 completes the establishment of the VPN server, the main routing device 110 automatically synchronizes the VPN configuration corresponding to the VPN server to one or more sub-routing devices under the main routing device 110.

In step S304, the network device 120 receives and records the VPN configuration. The network device 120 may record the VPN configuration to the storage device 122 of the network device 120. In detail, when the network device 120 maintains the connection of the mesh network with the main routing device 110, the network device 120 may receive the VPN configuration from the main routing device 110.

In step S305, the network device 120 is disconnected from the main routing device 110. Specifically, the network device 120 may be moved to another place and disconnected from the main routing device 110. When the network device 120 is disconnected from the main routing device 110, the network device 120 is removed from the mesh network 10 and will no longer serve as a network access node of the mesh network 10. For example, the network device 120 may be carried by the user from home to a hotel. In addition, the network device 120 may be moved by the user from an office of a parent company to a branch office.

In step S306, the network device 120 is connected to the Internet. In detail, after the network device 120 is disconnected from the main routing device 110, the network device 120 may be connected to the Internet again. In some embodiments, the network device 120 may be connected to the Internet based on a connection mode, and the connection mode is, for example, a standalone router mode, a wireless repeater mode, a wireless access point mode, a wireless Internet service provider (WISP) mode, etc. In some embodiments, the network device 120 may be connected to the Internet based on a network protocol, and the network protocol is, for example, a point-to-point protocol over Ethernet (PPPoE), a dynamic host configuration protocol (DHCP), a static IP protocol, the point to point tunneling protocol (PPTP), the layer two tunneling protocol (L2TP), an IPv6 protocol, or an IPv4 protocol. The disclosure is not limited thereto.

In step S307, the network device 120 determines whether to be connected to the Internet through the main routing device 110. In detail, the network device 120 determines whether it is connected to the Internet through the mesh network of the main routing device 110. That is, the network device 120 determines whether the network device 120 is the network access point in the mesh network including the main routing device 110.

In some embodiments, the network device 120 may determine whether to be connected to the Internet through the main routing device 110 according to a routing path of a packet. More specifically, by determining whether the routing path of the packet includes a network address of the main routing device 110, the network device 120 may determine whether the network device 120 is connected to the Internet through the main routing device 110. When the routing path of the packet includes the network address of the main routing device 110, the network device 120 may determine that the network device 120 is connected to the Internet through the main routing device 110. On the contrary, when the routing path of the packet does not include the network address of the main routing device 110, the network device 120 may determine that the network device 120 is not connected to the Internet through the main routing device 110.

If it is determined to be "No" in step S307, in step S308, in response to not being connected to the Internet through the main routing device 110, the network device 120 decides to establish the VPN connection with the main routing device 110 according to the VPN configuration. In detail, when the network device 120 determines that it is not the sub-routing device under the main routing device 110, the network device 120 may establish the VPN connection according to the VPN configuration stored in the storage device 122. The network device 120 may automatically establish the VPN connection with the main routing device 110 according to the user name, user password, VPN server address, port, key, or encryption method, etc. in the VPN configuration.

In some embodiments, the network device 120 may use the user name and the user password in the VPN configuration to submit an authentication request to the main routing device 110 for identity authentication. When the main routing device 110 determines that the network device 120 has passed the identity authentication, the main routing device 110 serving as the VPN server may establish the VPN connection with the network device 120 serving as a VPN client.

In some embodiments, after the network device 120 establishes the VPN connection with the main routing device 110, the network device 120 transmits a packet from a terminal device to the main routing device 110 according to the VPN connection. The network device 120 will use the VPN server address in the VPN configuration to modify the packet transmitted by the terminal device, so that the packet output by the network device 120 may be transmitted to the main routing device 110, thereby forming a virtual tunneling between the network device 120 and the main routing device 110.

If it is determined to be "Yes" in step S307, in step S309, in response to being connected to the Internet through the main routing device 110, the network device 120 decides not to establish the VPN connection with the main routing device 110. In detail, when the network device 120 determines that the network device 120 is still the sub-routing device under the main routing device 110 and is connected to the Internet through the main routing device 110, the network device 120 does not establish the VPN connection with the main routing device 110, that is, does not establish the VPN connection according to the VPN configuration in the storage device 122.

Figure 4A:
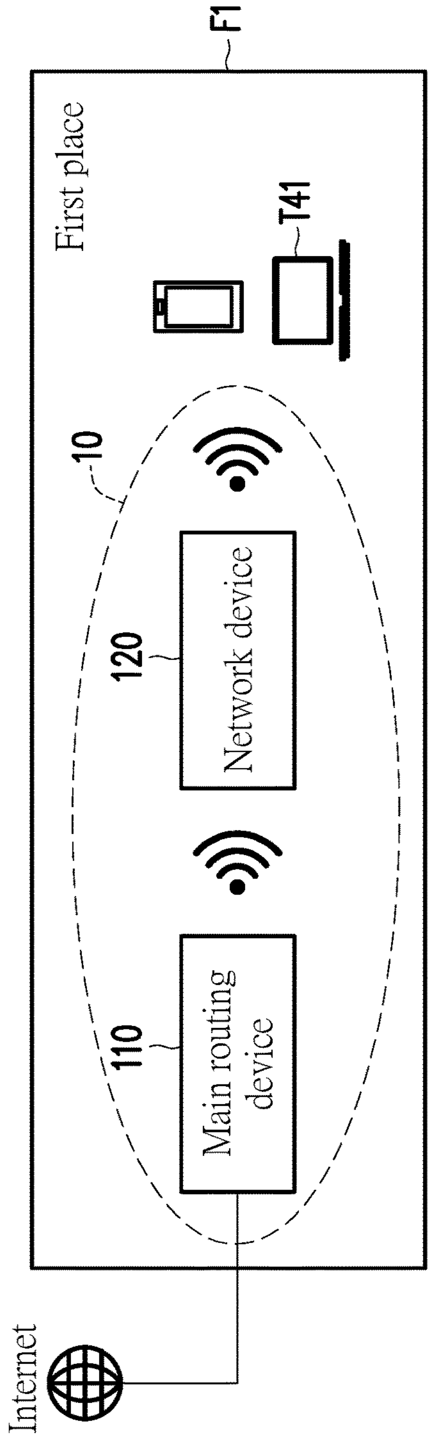
FIG. 4A is a schematic view of a network device serving as a sub-routing device under a main routing device according to an embodiment of the disclosure.

Referring to FIG. 4A first, the main routing device 110 and the network device 120 are deployed by the user in a first place F1, and the first place F1 is, for example, home of the user. The main routing device 110 and the network device 120 may establish the mesh network 10. The main routing device 110 serves as the gateway connected to the Internet, and the network device 120 serves as the sub-routing device under the main routing device 110. A terminal device T41 is connected to the Internet through the main routing device 110 and the network device 120. After the main routing device 110 establishes the VPN server, it will transmit the VPN configuration to the network device 120.

Figure 4B:
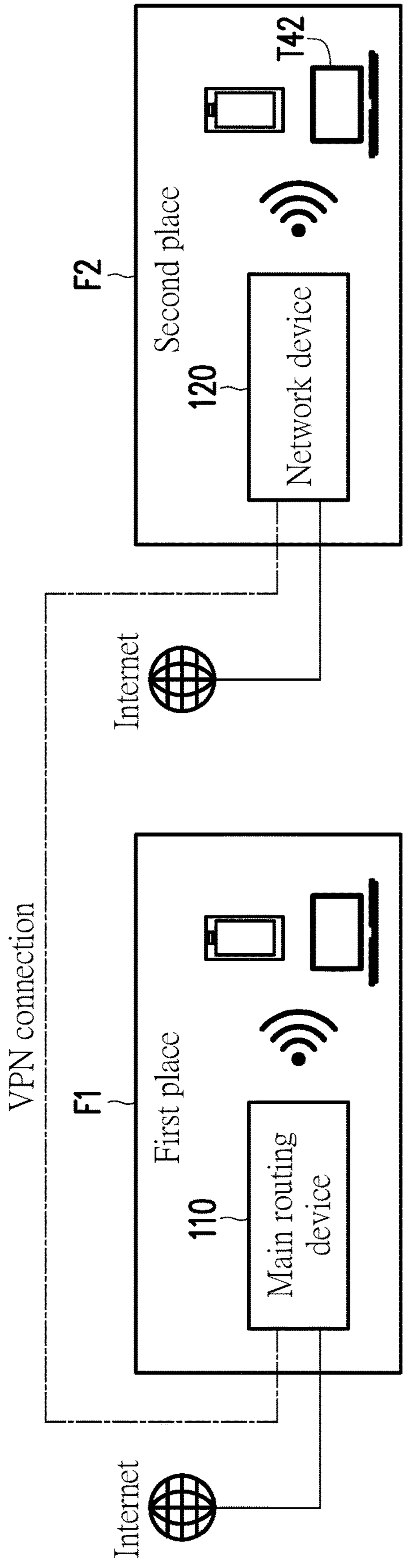
FIG. 4B is a schematic view of establishing a VPN connection between a main routing device and a network device according to an embodiment of the disclosure.

Next, referring to FIG. 4B, the user may move the network device 120 from the first place F1 to a second place F2, and the second place F2 is, for example, the hotel. When the user connects the network device 120 in the second place F2 to the Internet, the network device 120 will automatically establish the VPN connection between the network device 120 and the main routing device 110 according to the previously recorded VPN configuration. Specifically, the network device 120 serving as the VPN client may establish the VPN connection with the main routing device 110 serving as the VPN server. In this way, the packet transmitted by a terminal device T42 of the user in the second place F2 will be transmitted to the main routing device 110 through the VPN connection. As a result, in response to being moved to the second place F2, the network device 120 may be converted into the gateway connected to the Internet, and automatically establish the VPN connection with the main routing device 110.

It should be noted that in the various embodiments of the disclosure, the network device 120 in FIGS. 1 to 4 is the sub-routing device under the main routing device 110 and may establish the mesh network with the main routing device 110.

Figure 5:
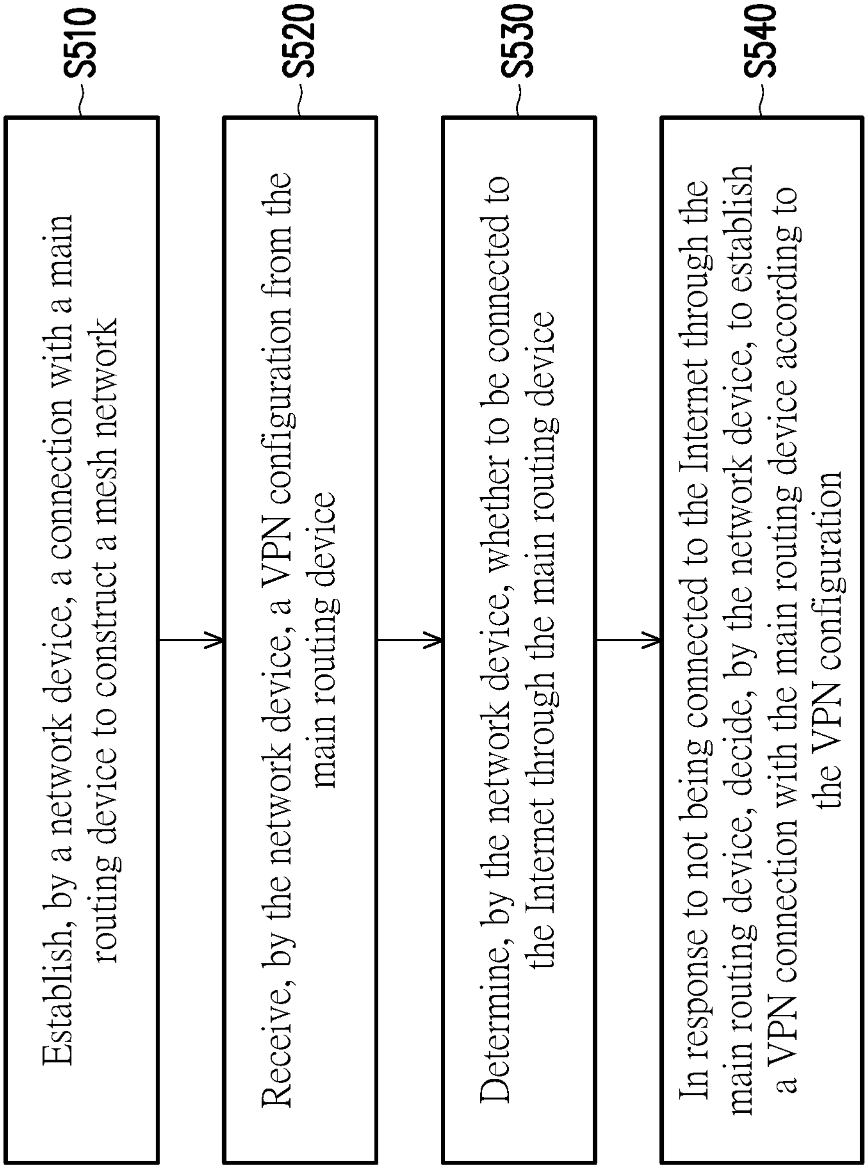
FIG. 5 is a flowchart of a method for establishing a VPN connection according to an embodiment of the disclosure.

Referring to FIG. 5, in step S510, a network device establishes a connection with a main routing device to construct a mesh network. The network device is a sub-routing device of the mesh network. In step S520, the network device receives a VPN configuration from the main routing device. The main router device is a VPN server corresponding to the VPN configuration. In step S530, the network device determines whether to be connected to the Internet through the main routing device. In step S540, in response to not being connected to the Internet through the main routing device, the network device decides to establish a VPN connection with the main routing device according to the VPN configuration. Implementations and details of steps S510 to S540 have been described in detail in the embodiments of FIGS. 1 to 4B, so no further description is incorporated herein.

Based on the above, in the embodiment of the disclosure, through the establishment of the mesh network, the main routing device as the VPN server may automatically synchronize the VPN configuration to the network device as the sub-routing device. Therefore, when the network device is not connected to the Internet as the sub-routing device of the main routing device, the network device may automatically establish the VPN connection with the main routing device according to the VPN configuration. On this basis, by carrying the network device to different places, the automatic establishment of the VPN connection in the disclosure allows private data of the user to have VPN encryption protection in different places without cumbersome setting steps. In addition, by automatically establishing a cross-regional VPN connection, not only may the coverage of the mesh network be effectively expanded, but also allow the terminal device to achieve cross-regional data access.

What is claimed is:

1. A method for establishing a virtual private network (VPN) connection, comprising:

establishing, by a network device, a connection with a main routing device in a first place to construct a mesh network, wherein the network device is a sub-routing device of the mesh network;

receiving, by the network device, a VPN configuration from the main routing device, wherein the main routing device is a VPN server corresponding to the VPN configuration;

determining, by the network device, whether to be connected to Internet through the main routing device, wherein the step of determining whether to be connected to the Internet through the main routing device comprises:

determining, by the network device, whether to be connected to the Internet through the main routing device according to a routing path of a packet by determining whether the routing path of the packet includes a network address of the main routing device; and in response to the sub-routing device being moved from the first place to a second place and the sub-routing device not being connected to the Internet through the main routing device in the second place, deciding, by the network device, to establish a VPN connection with the main routing device according to the VPN configuration.

2. The method for establishing the VPN connection according to claim 1, further comprising:

in response to being connected to the Internet through the main routing device, deciding, by the network device, not to establish the VPN connection with the main routing device.

3. The method for establishing the VPN connection according to claim 1, further comprising:

recording, by the network device, the VPN configuration to a storage device of the network device.

4. The method for establishing the VPN connection according to claim 1, further comprising:

after establishing the VPN connection with the main routing device, transmitting, by the network device, a packet from a terminal device to the main routing device according to the VPN connection.

5. The method for establishing the VPN connection according to claim 1, further comprising:

establishing, by the main routing device, the VPN server to generate the VPN configuration; and in response to generating the VPN configuration, synchronously transmitting, by the main routing device, the VPN configuration to the network device in the mesh network.

6. A network device, comprising:

a transceiver;

a storage device; and a processor coupled to the transceiver and the storage device, and configured to:

establish a connection with a main routing device in a first place to construct a mesh network, wherein the network device is a sub-routing device of the mesh network;

receive a VPN configuration from the main routing device, wherein the main routing device is a VPN server corresponding to the VPN configuration;

determine whether to be connected to Internet through the main routing device; and in response to the sub-routing device being moved from the first place to a second place and the sub-routing device not being connected to the Internet through the main routing device in the second place, decide to establish a VPN connection with the main routing device according to the VPN configuration, wherein the processor is further configured to:

determine whether to be connected to the Internet through the main routing device according to a routing path of a packet by determining whether the routing path of the packet includes a network address of the main routing device, and in response to the routing path of the packet including the network address of the main routing device, determine that the sub-routing device is connected to the Internet through the main routing device.

7. The network device according to claim 6, wherein the processor is further configured to:

in response to being connected to the Internet through the main routing device, decide not to establish the VPN connection with the main routing device.

8. The network device according to claim 6, wherein the processor is further configured to:

record the VPN configuration to a storage device of the network device.

9. The network device according to claim 6, wherein the processor is further configured to:

after establishing the VPN connection with the main routing device, transmit a packet from a terminal device to the main routing device according to the VPN connection.

10. A method for establishing a virtual private network (VPN) connection, comprising:

establishing, by a network device, a connection with a main routing device in a first place to construct a mesh network, wherein the network device is a sub-routing device of the mesh network;

receiving, by the network device, a VPN configuration from the main routing device, wherein the main routing device is a VPN server corresponding to the VPN configuration;

determining, by the network device, whether to be connected to Internet through the main routing device, wherein the step of determining whether to be connected to the Internet through the main routing device comprises:

determining, by the network device, whether to be connected to the Internet through the main routing device according to a routing path of a packet by determining whether the routing path of the packet includes a network address of the main routing device, and in response to determining that the routing path of the packet does not include the network address of the main routing device, the network device determines that the network device is not connected to the Internet through the main routing device; and in response to the sub-routing device being moved from the first place to a second place and the routing path of the packet not including the network address of the main routing device corresponding to the sub-routing device not being connected to the Internet through the main routing device in the second place, deciding, by the network device, to establish a VPN connection with the main routing device according to the VPN configuration.

* * * * *